United States Patent
De Buyst et al.

[11] Patent Number: 6,025,560
[45] Date of Patent: Feb. 15, 2000

[54] OUTER PROTECTION WITH SHIELD-BREAK FOR HIGH-VOLTAGE CABLE JOINT

[75] Inventors: Jo De Buyst, Aalst; Jozef Renier Catharina Cardinaels, Wetteren, both of Belgium

[73] Assignee: Alcatel, Paris, France

[21] Appl. No.: 09/195,435

[22] Filed: Nov. 18, 1998

[30] Foreign Application Priority Data

Nov. 28, 1997 [EP]  European Pat. Off. .............. 97402883

[51] Int. Cl.[7] ...................................................... H01R 4/00
[52] U.S. Cl. .......................................... 174/88 C; 439/98
[58] Field of Search ................................ 174/73.1, 74 R, 174/75 R, 78, 88 R, 88 C, 84 R; 439/98, 99

[56] References Cited

U.S. PATENT DOCUMENTS

| | | | |
|---|---|---|---|
| 4,099,021 | 7/1978 | Venezia ................................... | 174/73.1 |
| 4,424,410 | 1/1984 | Edgerton ................................ | 174/73.1 |
| 4,742,184 | 5/1988 | Courty et al. ......................... | 174/73.1 |
| 4,822,952 | 4/1989 | Katz et al. ............................. | 174/73.1 |
| 5,171,940 | 12/1992 | Vallauri ................................ | 174/73.1 |
| 5,502,279 | 3/1996 | Mirebeau et al. ..................... | 174/73.1 |
| 5,821,459 | 10/1998 | Cheenne-Astorino et al. ....... | 174/73.1 |
| 5,868,584 | 2/1999 | Cook et al. ............................ | 439/98 |

FOREIGN PATENT DOCUMENTS

| | | |
|---|---|---|
| 0 496 253 A2 | 7/1992 | European Pat. Off. . |
| 94 15 782 U1 | 3/1996 | Germany . |

OTHER PUBLICATIONS

"Cross–bonding joint 123 kv type MP1.123–31/32" Cortaillod Cossonay Cable.

*Primary Examiner*—Kristine Kincaid
*Assistant Examiner*—Chau N. Nguyen
*Attorney, Agent, or Firm*—Sughrue, Mion, Zinn, Macpeak & Seas, PLLC

[57] ABSTRACT

A high-voltage cable joint for interconnecting terminus of conductors (4; 5) of a first (1) and a second (2) power cable, each cable having a metallic screen (10; 11) separated from the conductor by an insulation layer (6; 7) and a semi conductive layer (8/9). The cable joint includes a junction body (3) that is an insulated box wherein the conductors are interconnected. The metallic screen (10) of the first power cable (1) is electrically connected to one end of a first metallic tubular shielding member (19) of which the other end extends beyond the junction body. This member (19) is separated from the junction body by an insulation shield-break sleeve (22) and both have an end overhanging beyond the end of the junction body. The metallic screen (11) of the second power cable (2) is electrically connected to an end of a second tubular shielding member (20) that is a rigid tube of which the other end abuts against the end of the junction body (3) and is partially engaged underneath the end of the shield-break sleeve (22) and thus also of the first tubular shielding member (19) without having an electrical contact therewith. An insulation ring (23) is provided at the end of the second shielding member (20). This ring has a recessed part that is engaged, with a tight fit, underneath the end of the insulation sleeve (22). Preferably the insulation sleeve (22) is further pressed against the insulation ring (2). In this way, a relatively cheap, light and easy to handle cable joint with good water impervious shield-break is provided.

14 Claims, 2 Drawing Sheets

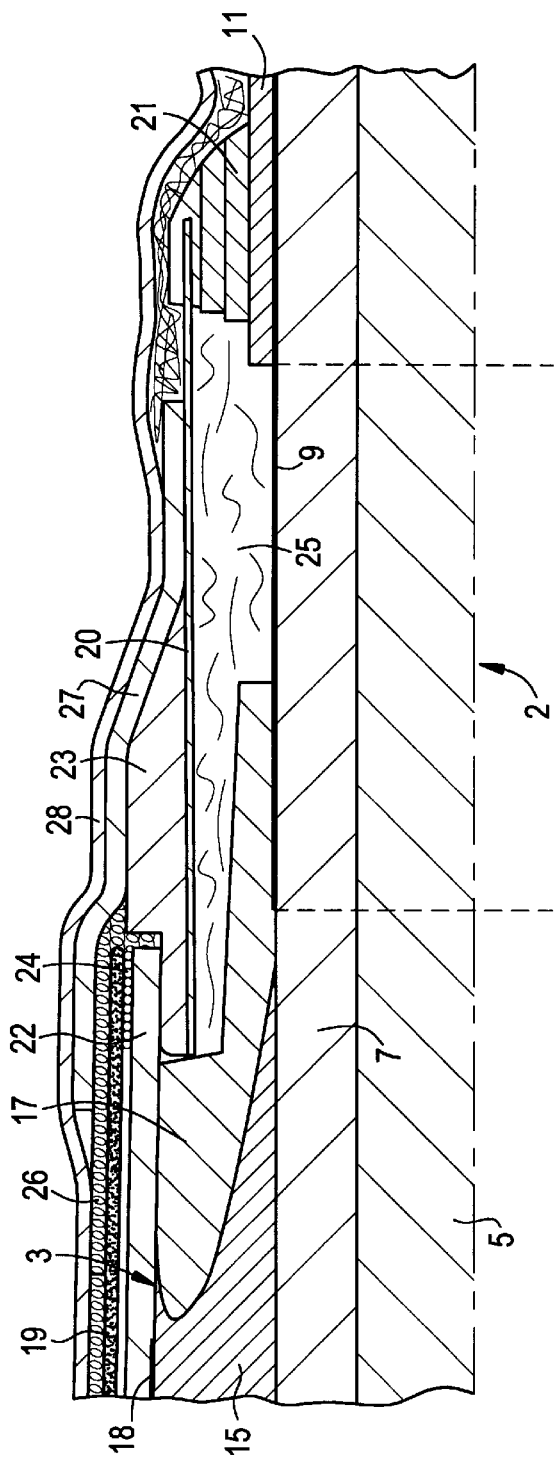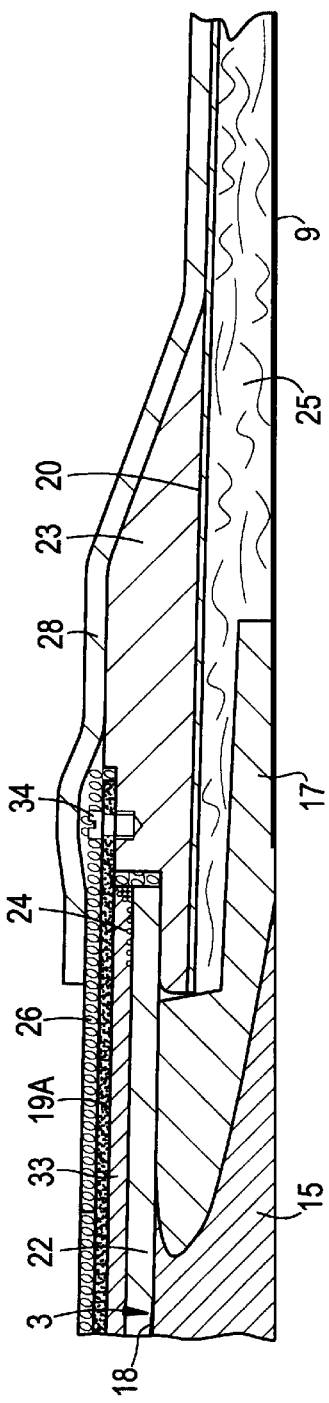

OUTER PROTECTION WITH SHIELD-BREAK FOR HIGH-VOLTAGE CABLE JOINT

BACKGROUND OF THE INVENTION

The present invention relates to a high-voltage cable joint for connecting terminus of conductors of a first and a second power cable, the conductor of each cable being surrounded by, successively, a first insulation layer, a semi-conductive layer, a metallic screen and a second insulation layer, said cable joint including a junction body comprising connection means for connecting together bared parts of the terminus of said conductors and insulation means surrounding, from a first end to a second end thereof, bared parts of the semi-conductive layer, of the first insulation layer and of the conductor of said first power cable, said connection means, and bared parts of the conductor, of the first insulation layer and of the semi-conductive layer of said second power cable, the metallic screen of said first power cable being electrically connected to a first end of a first metallic tubular shielding member that covers said junction body and has a second end overhanging beyond the second end of the junction body, an insulation sleeve being provided between said junction body and said first shielding member, said insulation sleeve also having an end overhanging beyond said second end of the junction body, and the metallic screen of said second power cable being electrically connected to a second end of a second metallic tubular shielding member that has a first end abutting against said second end of said junction body, said first end of said second shielding member being partially engaged underneath the hanging end of said insulation sleeve as well as under the second end of said first shielding member without having an electrical contact therewith.

Such a cable joint is already known in the art, e.g. from "Cross-bonding joint 123kV" type MP1. 123-31/32 of "CORTAILLOD COSSONAY CABLE".In this known cable joint, a pre-insulated rigid metallic tube is used as first tubular shielding member for covering the whole junction body. A first end of the rigid tube is soldered to the metallic screen of the first power cable, whilst at the other end of the cable joint, a relatively big epoxy insulator surrounds the second power cable and is partially engaged into the second end of the metallic tube. The epoxy insulator has embedded two conductors electrically separated from each other and connected to distinct terminals. One terminal is electrically connected to the metallic tube, whilst the other terminal is soldered to the metallic screen of the second power cable. The embedded conductors extend out from the epoxy insulator, diametrically opposed, at a same end of the cable joint where earthing connection and/or cross-bonding is then possible.

Normally, all the layers of the two power cables should be continued through the cable junction. They are therefore re-constructed one after the other. For instance, the terminus of the conductors are interconnected by the connection means, the insulation layers are continued through the junction body, the metallic screens, that also have an important watertightness shielding role, are continued through the tubular shielding members, etc. . . . It is however to be noted that the electrical contact between the metallic screens of the power cables is preferably interrupted at a so-called "shield-break" and that each metallic screen is electrically accessible from outside the cable joint. The reason therefore is to allow the well known cross-bonding. Cross-bonding may for instance be necessary in multi-phase, e.g. three-phase, cable installation where the currents that are induced in the metallic screens of the power cables can become intolerably high. These currents can then be eliminated by dividing the screens into isolated sections that are cross-interconnected between the power cables of different phases.

In the known cable joint, the interrupted shielding layer or shield-break is made water impervious owing to the epoxy insulator. However, the weight of the casing and of such an epoxy insulator is relatively high. As a consequence, it is relatively difficult to handle the parts of this known cable joint. This cable joint is further also relatively expensive because of the materials used therein.

SUMMARY OF THE INVENTION

An object of the present invention is to provide a cable joint of the above known type but whereof the weight is reduced, so that it will be easy to handle, and which, additionally, is relatively cheap, while having a good water impervious shield-break.

According to the invention, this object is achieved due to the fact that an insulation ring is provided with a tight fit over at least the first end of said second metallic tubular shielding member, that said insulation ring has at least a first end that is engaged underneath the hanging end of said insulation sleeve, and that pressing means are provided to press said hanging end of said insulation sleeve against the first end of said insulation ring.

It is known that an insulation sleeve provided over the junction body increases the insulation between the first metallic tubular shielding member and the power cables. By using the overhanging end of the insulation sleeve to overlap the insulation ring, and by pressing this end against the insulation ring, a water impervious shield-break is created between the metallic screens of the two power cables. Because of this simple structure and of the materials used, this shield-break is relatively cheap and light, whereby the cable joint is relatively easy to handle. It can further also be proved that, owing to the present structure, the electrical strength of the shield-break is optimized.

Another characteristic feature of the present invention is that said pressing means are made of elastic material.

The pressing means are for instance a rubber tape or a cleating wire.

Also another characteristic feature of the present invention is that, at said first end of said insulation ring, the external diameter of said ring ends with a recessed part that is engaged underneath the hanging end of said insulation sleeve.

Furthermore, at the second end of said insulation ring, the external diameter thereof has a dimension that increases substantially from the external diameter of said second metallic tubular shielding member towards the external diameter of said insulation sleeve in the direction of the first end of said insulation ring.

The overall diameter of the cable joint is thereby more regular. Additionally, said hanging end of said insulation sleeve, said second end of said insulation ring and the second end of said second metallic tubular shielding member are all coated by a covering second insulation sleeve.

The present invention is also characterized in that said second metallic tubular shielding member is a rigid cylindrical tube having a diameter that is relatively larger than the external diameter of the metallic screen of said second power cable, and in that the gap between said rigid second metallic tubular shielding member and said metallic screen of said second power cable is filled with knitted metal wires.

This increases the mechanical stability and the filling provides a good thermal conductivity for the cable joint.

Another particular feature of the invention is that, said first metallic tubular shielding member is made of flexible metallic material that fits on the outer surface of the first mentioned insulation sleeve.

In this way, the flexible metallic tube follows the shape of the insulation sleeve in order to provide a low thermal resistance.

In a variant of the present invention, said first metallic tubular shielding member is a rigid cylindrical tube of which said second end extends over said insulation ring.

Such a structure is more rigid.

In more detail, said second end of said rigid first metallic tubular shielding member fits over said insulation ring and is mechanically attached thereto.

The attachment is for instance realized by means of screws.

In order to increase the thermal conductivity, a compression layer of knitted metal wires is wound around the first mentioned insulation sleeve to fill a possible gap between said first insulation sleeve and the rigid first metallic tubular shielding member.

The present cable joint is further also characterized in that the metallic screen of said first power cable is provided with a first terminal to which the central conductor of a coaxial cable is connected, in that the metallic screen of said second power cable is provided with a second terminal to which the screening of said coaxial cable is connected, in that the insulated central conductor of said coaxial cable runs over said junction body from the first end to the second end thereof, and in that, in the area of the metallic screen of said second power cable, said insulated central conductor is coated by a field control sleeve that is placed on top of said covering second insulation sleeve, said field control sleeve being made of material having a relatively high dielectric constant.

The above mentioned earth connection and/or cross-bonding of the metallic screens of the power cables is thus possible owing to the coaxial cable. Because of this coaxial earth cable, the external earth connections are concentrated at one end of the cable joint. The field control sleeve provides a good electrical stress control, especially on the portion of the coaxial earth cable that passes along the shield-break.

Further characteristic features of the present cable joint are mentioned in the appended claims.

BRIEF DESCRIPTION OF THE DRAWING

The above and other objects and features of the invention will become more apparent and the invention itself will be best understood by referring to the following description of an embodiment taken in conjunction with the accompanying drawings wherein:

FIG. 2 is a detailed view, at an enlarged scale, of the upper right part of the cable joint shown at FIG. 1; and FIG. 3 is a detailed view, similar to FIG. 2, but of a variant of the cable joint of FIG. 1.

DETAILED DESCRIPTION OF THE INVENTION

Figure 1:
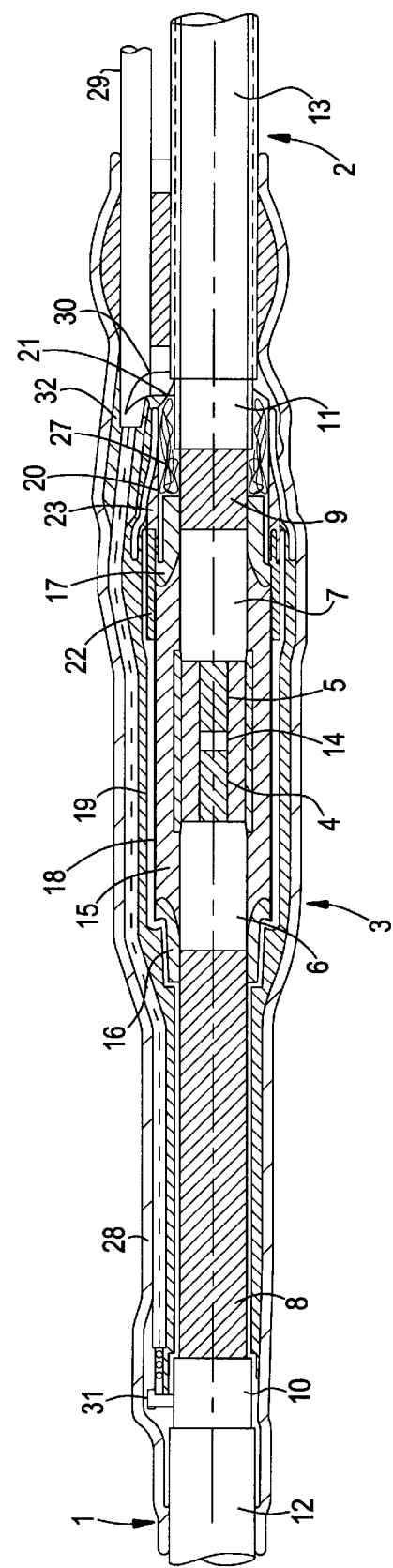
FIG. 1 is a longitudinal sectional view of a cable joint according to the invention.

The longitudinal section of a cable joint linking two high voltage or power cables, generally indicated by the referrals 1 and 2, is shown in FIG. 1. The cable joint includes a junction body 3 wherein the terminus of the bared conductors 4 and 5 of the two single core high voltage cables 1 and 2 respectively are electrically connected to each other and re-insulated. Each of these power cables 1/2 comprises a central conductor 4/5 surrounded by a first insulation layer 6/7 that is itself coated by a semi-conductive coating layer 8/9 covered by a lead sheath or metallic screen 10/11, the whole being surrounded by an outer PVC sheath or second insulation layer 12/13.

The junction body 3 comprises a connection part 14 adapted to electrically interconnect the conductors 4 and 5 of the cables and a pre-molded insulation box 15 covering the connection part 14 and portions of the first insulation layers 6, 7 of the cables. The insulation box 15 is generally made of rubber ending at each side with semi-conductive material 16, 17. This semi-conductive element 16/17 is a cone-shaped element that performs integrated stress control and is therefore in contact with the semi-conductive layer 8/9 of the cable 1/2 respectively. The junction body 3 is further provided with an external semi-conductive sleeve or layer 18 that is in contact with the semi-conductive material 16 at the side of the left-hand power cable 1 and extends almost up to the right end of the insulation box 15, without reaching the semi-conductive material 17. In other words, there is no contact between the semi-conductive sleeve 18 and the cone-shaped semi-conductive ending material 17. The continuity of the semi-conductive coating layers 8/9 of the cables 1/2 is thus interrupted near to the right end of the cable joint 3, almost at the intersection of the insulation box 15 with the semi-conductive material 17.

The metallic screen 10/11 of a power cable 1/2 is a water impervious metallic layer that has to be continued along the cable joint. However, a cable joint is generally also used to earth the screens of the involved power cables or to make cross-bonding on these screens 10/11. Cross-bonding means that, when for instance three single core power cables making up a three-phase cable installation are further connected to three other cables via three distinct cable joints, the screens of these cables are cross-interconnected. The metallic layers or screens are therefore interrupted and connected externally from the cable joints.

To this end, at both ends of the junction body 3, the screens 10 and 11 of the power cables 1 and 2 are bared over a predetermined length and are each soldered over their whole circumference to a metallic tubular shielding member 19 and 20 respectively. The tubular member 19 connected to the metallic screen 10 of the left power cable 1 is made of deformable metallic material like a lead or soft copper tubing or foil or even a metallized sheet of plastic. It covers, starting from the metallic screen 10, the semi-conductive layer 8 and the junction body 3, over which it has a cylindrical section with an enlarged and substantially constant diameter, and has a free end overhanging beyond the right end of the junction body. The flexible metallic member 19 can be put in direct contact with the outer surface of the junction body for minimizing the dimensions and lowering the thermal resistance. The tubular member 20 is a rigid metallic tube of which the diameter is slightly larger than that of the metallic screen 11 of the right power cable 2, but smaller than that of the cylindrical part of the tubular member 19 when it covers the junction body 3. The left end of the tube 20 is partially engaged over, and abuts against, the cone-shaped semi-conductive element 17 at the right end of the junction body 3, whilst the right end of this tube 20 is electrically and mechanically connected with the screen 11 through a metallic connection ring 21 joining them, the connection ring 21 being for instance soldered to these items.

The FIG. 2 shows, at an enlarged scale, the upper right part of the sectional view of FIG. 1. Thereat is more visible, amongst other, the semi-conductive cone-shaped element 17 provided at the right end of the junction body 3 and the rigid metallic tubular member or tube 20. The two tubular members 19 and 20 are separated by a so-called "shield-break" or insulation sleeve 22 making the shield interruption of the junction body 3. To this end, the insulation sleeve 22 is for instance a rubber sleeve that covers the junction body 3, or at least the right half end thereof, and is located between the semi-conductive sleeve 18 and the metallic member 19.

It is further also to be noted that the insulation sleeve 22 is particularly necessary for separating the part of the first tubular shielding 19 member that covers the second power cable 2. Therefore, it is sufficient that the insulation sleeve 22 only covers part of the right half of the length of the junction body 3.

The shield-break or insulation sleeve 22 also has an end overhanging beyond the right end of the junction body 3 for a length equal to that of the overhanging end of the metallic member 19. On the other hand, the left end of the tube 20 is surrounded by an insulation ring 23 that is attached thereto with a tight fit. From the right to the left, the insulation ring 23 has an external diameter increasing from the external diameter of metallic tube 20 towards the external diameter of the insulation sleeve 22. The insulation ring 23 however ends, at its left side, with a recessed diameter for a length that is equal to that of the overhanging end of the shield-break sleeve 22. The value of the recessed diameter corresponds to that of the internal diameter of the shield-break sleeve 22 underneath the hanging end of which it is engaged with a tight fit. The shield-break is thus realized by the mechanically interconnected shield-break sleeve 22 and insulation ring 23. An additional pressure is exerted between these two items by an elastic material like a rubber tape or a cleating wire (also called "fil de frette") 24 wound around the hanging end of the sleeve 22. In this way, the insulation ring 23 is mechanically well connected to the other parts of the joint. The electrical insulation of the two members 19 and 20 is also reinforced owing to the interconnected shield-break sleeve 22 and the insulation ring 23. It is to be noted that the hanging end of the tubular member 19 recovers the elastic material 24 and thus also the shield-break sleeve 22, and that the right hanging ends of the sleeve 22 and the tube 19 together end against the beginning of the recessed part of ring 23.

As already mentioned, the left end of the rigid metallic tube 20 is partially engaged over the cone-shaped semi-conductive element 17 so as to abut against the right end of the junction body 3. Since the diameter of this tube 20 is larger than that of the semi-conductive layer 9 of the power cable 2, the hollow volume or gap there-between is filled with metallic wire mesh or knitted metal wires 25.

An additional insulation 26 is wrapped around the tubular member 19 and an elastic insulation sleeve 27 is provided over the insulation ring 23, covering also the hanging right end of the tubular member 19 and a portion of the metallic tube 20. It is to be noted that during the assembly of the cable joint, the left end of the insulation sleeve 27 is first folded back (to the right) to expose the recessed outer diameter of the insulation ring 23. In more detail, when the latter is engaged underneath the shield-break sleeve 22, pressed thereto by the cleating wire 24 and covered by the metallic member 19, the additional insulation 26 is placed over this member 19. The elastic insulation sleeve 27 is then allowed to take its natural position, i.e. over the right end of the member 19. In a variant embodiment, the elastic sleeve 27 may, for instance, be replaced by the wrapping of an insulating tape, but this is electrically less reliable.

As also shown in FIG. 1, the whole cable joint is then covered with an additional insulation layer 28, e.g. a heat shrink sleeve or tape wrapping or a combination thereof.

The above mentioned earth connection and cross-bonding of the screens of the power cables is possible owing to a coaxial earth cable 29 that exits at an opening on the right of the insulation layer 28 as shown in FIG. 1. The coaxial cable 29 has its screen connected to a terminal 30 attached to the connection ring 21 on the outer surface of the metallic screen 11 of the power cable 2. The insulated central conductor of the coaxial cable 29 runs, inside the insulation layer 28, over the junction body 3 and is connected to another terminal 31 attached, e.g. by means of a connection ring (not shown), to the outer surface of the metallic screen 10 of the power cable 1. Near to the metallic screen 11 of the power cable 2, the right end of the insulated central conductor of the cable 29 is further coated by a field control sleeve 32 that is placed on top of the insulation sleeve 27. The sleeve 32 is a stress grading element made of a material having a high dielectric constant and provides thus a good electrical stress control, especially on the portion of the insulated control conductor of the coaxial cable 29 that passes along the shield-break. By using a coaxial earth cable, the external connections are concentrated at one end of the cable joint.

In an alternative embodiment, shown in FIG. 3, of the present cable joint, the metallic tubular shielding member connected to the metallic screen 10 of the power cable 1 is a rigid metallic tube 19A, at least over the junction body 3. The hanging right end of this rigid tube 19A extends further than that of the shield-break sleeve 22 and fits over the insulation ring 23 whereto it is attached by at least one screw 34, or any other mechanical attachment means. Since the shielding member 19A is now a rigid tube, the possible gap between this tube and the shield-break sleeve 22 is filled with a layer of compression material such as knitted metal wires 33 that are wound around the shield-break sleeve 22.

The use of a rigid tube as shielding member 19A increases the structural rigidity of the cable joint While the principles of the invention have been described above in connection with specific apparatus, it is to be clearly understood that this description is made only by way of example and not as a limitation on the scope of the invention, as defined in the appended claims.

We claim:

1. A high-voltage cable joint for connecting terminus of conductors (4; 5) of a first (1) and a second (2) power cable, the conductors (4/5) of each of said cables (1/2) being surrounded by, successively, a first insulation layer (6/7), a semi-conductive layer (8/9), a metallic screen (10/11) and a second insulation layer (12/13), said cable joint including a junction body (3) having a first end and a second end and comprising connection means (14) for connecting together bared parts of the terminus of said conductors and insulation means (15; 16, 17) surrounding bared parts of the semi-conductive layer (8), of the first insulation layer (6) and of the conductor (4) of said first power cable (1), said connection means, and bared parts of the conductor (5), of the first insulation layer (7) and of the semi-conductive layer (9) of said second power cable (2), the metallic screen (10) of said first power cable (1) being electrically connected to a first end of a first metallic tubular shielding member (19) that covers said junction body (3), a second end of the first metallic shielding member overhanging beyond the second end of the junction body, an insulation sleeve (22) being provided between said junction body and said first shielding member (19), said insulation sleeve also having an end overhanging beyond said second end of the junction body, and the metallic screen (11) of said second power cable (2) being electrically connected to a second end of a second metallic tubular shielding member (20), a first end of the second metallic tubular shielding member abutting against said second end of said junction body (3), said first end of said second shielding member being partially engaged underneath the hanging end of said insulation sleeve (22) as well as under the second end of said first shielding member (19) without having an electrical contact therewith, characterized in that an insulation ring (23) is provided with a tight fit over at least the first end of second metallic tubular shielding member (20), in that said insulation ring (23) has at least a first end that is engaged underneath the hanging end of said insulation sleeve (22), and in that pressing means (24) are provided to press said hanging end of said insulating sleeve (22) against the first end of said insulation ring (23).

2. A cable joint according to claim 1, characterized in that said pressing means (24) are made of elastic material.

3. A cable joint according to claim 1, characterized in that, at said first end of said insulation ring (23), the external diameter of said ring ends with a recessed part that is engaged underneath the hanging end of said insulation sleeve (22).

4. A cable joint according to claim 3, characterized in that the length of said recessed part is substantially equal to the length of the overhanging end of said insulation sleeve (22).

5. A cable joint according to claim 3, characterized in that, at the second end of said insulation ring (23), the external diameter thereof has a dimension that increases substantially from the external diameter of said second metallic tubular shielding member (20) towards the external diameter of said insulation sleeve (22) in the direction of the first end of said insulation ring (23).

6. A cable joint according to claim 5, characterized in that said hanging end of said insulation sleeve (22), said second end of said insulation ring (23) and the second end of said second metallic tubular shielding member (20) are all coated by a covering second insulation sleeve (27).

7. A cable joint according to claim 1, characterized in that said second metallic tubular shielding member (20) is a rigid cylindrical tube having a diameter that is relatively larger than the external diameter of the metallic screen (11) of said second power cable (2), and in that the gap between said rigid second metallic tubular shielding member (20) and said metallic screen (11) of said second power cable (2) is filled with knitted metal wires (25).

8. A cable joint according to claim 1, characterized in that the length of said second overhanging end of said first metallic tubular shielding member (19) is substantially equal to the length of the overhanging end of said insulation sleeve (22).

9. A cable joint according to claim 1, characterized in that said first metallic tubular shielding member (19) is made of flexible metallic material that fits on the outer surface of the insulation sleeve (22).

10. A cable joint according to claim 1, characterized in that said first metallic tubular shielding member is a rigid cylindrical tube (19A) of which said second end extends over said insulation ring (23).

11. A cable joint according to claim 10, characterized in that said second end of said rigid first metallic tubular shielding member (19A) fits over said insulation ring (23) and is mechanically attached (34) thereto.

12. A cable joint according to claim 10, characterized in that a compression layer (33) of knitted metal wires is wound around the insulation sleeve (22) to fill a possible gap between said insulation sleeve and said rigid first metallic tubular shielding member (19A).

13. A cable joint according to claim 6, characterized in that the metallic screen (10) of said first power cable (1) is provided with a first terminal (31) to which a central conductor of a coaxial cable (29) is connected, in that the metallic screen (11) of said second power cable (2) is provided with the second terminal (30) to which a screening of said coaxial cable (29) is connected, in that the central conductor of said coaxial cable runs over said junction body (3) from the second end to the first end thereof, and in that, in the area of the metallic screen (11) of said second power cable (2), said central conductor is coated by a field control sleeve (32) that is placed on top of said covering second insulation sleeve (27), said field control sleeve (32) being made of material having a relatively high dielectric constant.

14. A cable joint according to claim 13, characterized in that said central conductor of said coaxial cable runs inside an insulation layer (28) that covers the whole cable joint.

* * * * *